Feb. 7, 1928. 1,658,088
A. KIBLER
HAND SHEARS
Filed Dec. 23, 1925 2 Sheets-Sheet 1

Feb. 7, 1928.

A. KIBLER

HAND SHEARS

Filed Dec. 23, 1925

1,658,088

2 Sheets-Sheet 2

Patented Feb. 7, 1928.

1,658,088

UNITED STATES PATENT OFFICE.

ALOIS KIBLER, OF PASING, NEAR MUNICH, GERMANY.

HAND SHEARS.

Application filed December 23, 1925, Serial No. 77,258, and in Germany December 20, 1924.

This invention relates to hand shears which, owing to their special construction, are adapted to manifold uses. The improved hand shears are not only capable to cut from flat irons up to a thickness of 6 mms., sheet iron and band iron, and strips of a limited length, also to cut out circular disks, to make V-shaped cuts, to cut mitres, to slit flat or round tubular objects and the like. The improved hand shears are specially adapted for slitting and V-cutting of stationary articles, for instance of a T- or angle-iron fixed on a wall, of elements of machines, boilers or the like, quite close to the end faces. The improved shears, in which the operator has both his hands above the work, can further be clamped in any vise and thus brought into the most favorable position with regard to the existing sources of light as the shears are capable to cut forwards, backwards and in lateral directions, e. g. towards all sides.

The invention is characterized in that the body of the shears recedes at its front end face behind the blades and that the top blade is operated by a pressing slide controlled by an eccentric sector.

Figure 1:
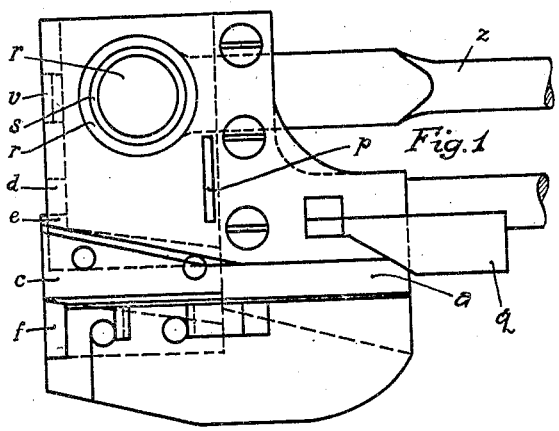
Figure 2:
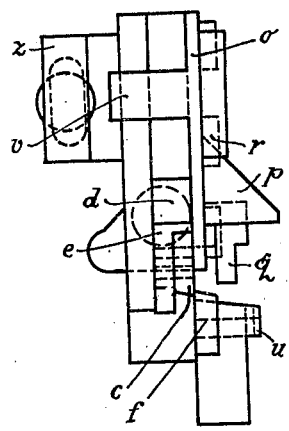
Figure 3:
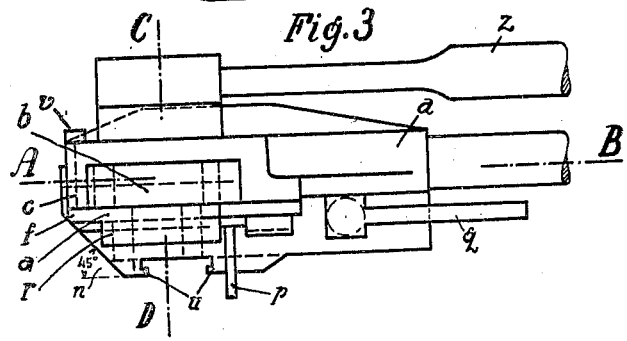
Figure 4:
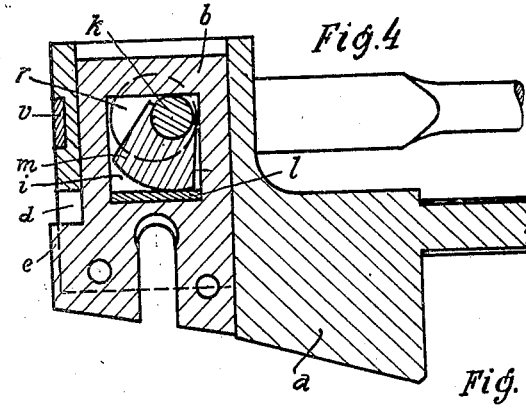
Figure 5:
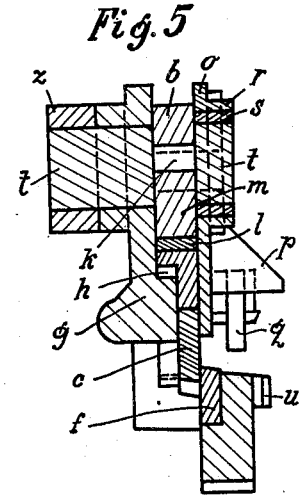
Figure 6:
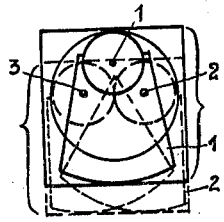
Figure 7:
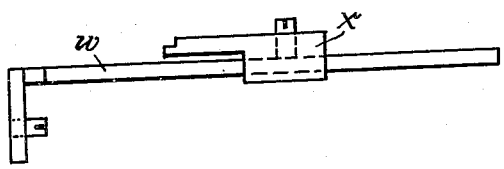
Figure 9:
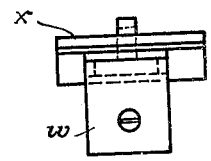
Figure 8:
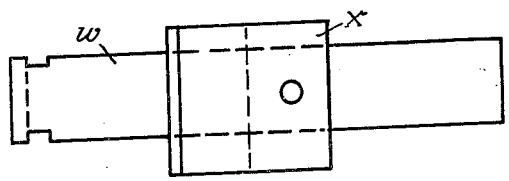
Figure 10:
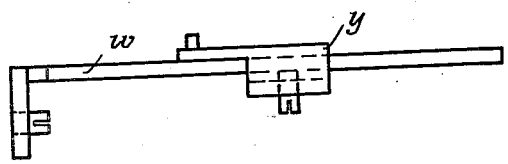
Figure 12:
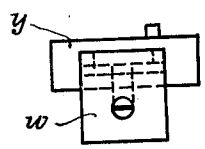
Figure 11:
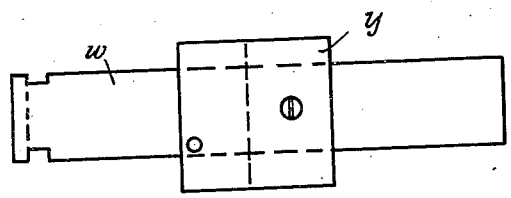

An embodiment of the invention is shown, by way of example, in the accompanying drawing in which Fig. 1 is a side elevation.
Fig. 2 a front elevation and
Fig. 3 a plan view.
Fig. 4 is a longitudinal section on line A—B of Fig. 3.
Fig. 5 is a cross section on line C—D of Fig. 3.
Fig. 6 shows a single element of the shears in different positions.
Figs. 7, 8 and 9 are, respectively, a side elevation, a top plan view, and an end elevation of a work supporting angle iron bracket adapted for attachment to the body and supporting strips of metal for a cutting action of the blades thereon.
Figs. 10, 11 and 12 are, respectively, a side elevation, top plan view, and end elevation of an angle iron work supporting bracket for supporting blades or disks for adjustment in cutting the same on circular lines.

The body $a$ of the shears, which is preferably forged of steel, has an indentation designed to receive the pressing slide $b$ and the top blade or knife $c$ fixed on said slide. The body $a$ has further a front opening $d$ for the extension $e$ of the pressing slide in which opening the extension $e$ moves in the up and down motion of slide $b$. In the lower portion of the body of the shears a stationary knife or blade $f$ is mounted in a corresponding opening.

By this construction of the blades and manner in which they are mounted, the forward portions of the blades extend to the front of the body, and may project in advance thereof, allowing cuts to be made in a piece of work up to the line of an abutment which the work intersects or by which it is carried without interference from the body. Thus, for example, a horizontal flange projecting from a vertical element on which said flange is mounted or by which it is carried may be cut through up to the line of the element without any interference from the body of the tool.

The pressing slide is guided on a rib or projection $g$ of the body $a$ of the shears and has a slot $h$ for this purpose. The slide $d$ has further a rectangular opening $i$ which is lined at the lower end with a steel insertion $l$. In this opening $i$ the driving mechanism is located, which consists of an eccentric pin $k$ bearing against the upper wall of the opening and carrying a rocking wing $m$ in the shape of a sector the enveloping surface of which extends radially around the centre of the pin $k$ and rolls on the insertion $l$.

The body $a$ of the shears is provided with a removable cover plate or face plate $o$ which has a nose $p$ for the stripping iron $q$. On the cover $o$ a hub $r$ with an annular bearing $s$ for the axle $t$ of the eccentric pin is arranged, said axle projecting also through the opposite or rear side of the body, this rear end carrying a hand lever $z$. The cover $o$ is fixed from the rear by means of a screw. On the front side it is held by a clamp $v$ which is flush with the end face of the body of the shears so that no fixation elements project on the front side. The body $a$ of the shears recedes behind the extension $e$ of the pressing slide $b$ or behind the end faces of the blades $c$, $f$. The lower arm of the body of the shears is conveniently inclined in rearward direction for instance at an angle of 45°. The body has at its top undercut cheeks $u$ designed to accommodate an angle iron $w$ (Figs. 7–12) on which either an abutment $x$ for the cutting of strips or a plate $y$ having a stud is removably fixed which plate serves for the cutting of circles. As the knives form the projecting parts of the shears it is possible to cut with the shears up to a vertical limiting face above or below the portion of the work to be cut, this being not possible with any hand-shears of known type.

The bevelling of the lower body of the shears permits of executing V-shaped cuts in the work of angles up to 45° and close to the perpendicular limiting faces of the work.

The great shearing and torsional pressure acting in the execution of V-shaped cuts in forward direction is sustained by the projection g, thus relieving the blades and body of undue stress.

The wing m rolls to and fro at the operation of the shears upon the insertion l frictionless in the manner seen from Fig. 6, so that the loss from friction is reduced as much as possible. By the radial rolling a secure drawing along of the slide is obtained which remains permanently uniform so that the slide is guided positively and reliably.

I claim:—

1. In cutting shears, a body having a horizontal transverse work receiving slot and upper and lower blade supporting portions lying above and below and on opposite sides of the line of said slot, the upper blade supporting portion being provided with a slideway having an opening in the lower portion of its front wall forming a guideway and a stop at the upper end thereof, a stationary blade carried by the lower blade supporting portion of the body, a slide mounted in the slideway of the upper supporting portion of the body, said slide having a slot in its upper portion and a movable blade carried by the slide, said blade having an extension engaging said guide opening in the front wall of the guideway, a stationary handle on the body, a movable handle pivotally mounted on the body, means actuable by said movable handle and operatively mounted in the slot in the slide for operating the movable blade, and a projection upon a wall of the slideway in guided engagement with the opening in the lower portion of the slide.

2. In cutting shears, a body having a work receiving slot, relatively movable cutting blades, means for manipulating the tool and actuating the movable cutter blade, a support at one side of the body, and a member engageable with said support and having means for engagement with a piece of work for laterally supporting the work and for adjusting the work with relation to the slot and the stationary cutting blades.

3. In cutting shears, a body having a work receiving slot, relatively fixed and movable cutting blades, means for manipulating the tool and actuating the movable cutter blade, supporting means on one side of the body and at one side of said stationary blade, an angular supporting member engageable with said supporting means, and means on said member for engagement with a piece of work whereby the latter may be laterally supported and adjusted with relation to the slot and the stationary cutter blade.

4. Cutting shears comprising a body having upper and lower supporting portions arranged in different parallel planes, and provided with a horizontal transverse work receiving slot between said portions, a stationary cutting blade upon the lower supporting portion, a movable cutting blade guided upon the upper supporting portion, said upper supporting portion having a recess at the forward end thereof through which the forward end of the upper blade extends, both blades having their forward ends extending in advance of the front of the body, and means for actuating the movable cutter blade.

5. Cutting shears comprising a body having upper and lower blade supporting portions arranged in different parallel planes and provided with a horizontal transverse work receiving slot between said supporting portions, a stationary cutting blade carried by the lower supporting portion, a slide movable in the upper supporting portion and having a slot therein, a movable cutting blade carried by said slide, a transverse shaft journaled upon the upper supporting portion and extending through the slot in the slide, a slide actuating means actuated by said shaft and disposed in said slot in the slide and engageable with the slide for imparting cutting motion thereto, a stationary handle carried by the body, and a coacting movable handle connected with the shaft, said handles being disposed in superposed relation and both above the cutting plane of the cutting blades.

6. Cutting shears comprising a body, a stationary cutter blade on the body, a slide enclosed in the body and having a slot therein, a movable cutting blade carried by the slide, a shaft journaled in the body and provided with a crank pin, and a rocker wing enclosed in the body and coacting with the pin for reciprocating the slide.

7. Cutting shears comprising a body having a lower supporting portion and an upper supporting portion disposed in different parallel planes, and provided with a horizontal work receiving slot between said portions, the forward portion of said lower supporting portion having an upper face inclined outwardly and rearwardly in a longitudinal direction, and the upper supporting portion having a lower face inclined in a rearward and downward direction, a stationary cutting blade carried by the lower supporting portion and extending at its cutting edge above its inclined face, and a movable cutting blade mounted upon the upper supporting portion and movable across the slot for coaction with the lower cutting blade, the said inclined faces of said supporting portion permitting angular tilting of the shears at angles to each other for angular cutting in planes inclined to the vertical and the horizontal.

8. Cutting shears comprising a lower supporting portion and an upper supporting portion arranged in different parallel planes, and having a transverse work receiving slot disposed between said portions, the upper portion being provided with a guideway, a stationary cutting blade carried by the lower supporting portion, a slide movable in the guideway of the upper supporting portion, said slide having a slot in its upper portion and a guideway in its lower portion, a movable cutting blade carried by the lower portion of the slide, a guide rib upon one of the walls of the guideway engaging the guideway in the slide to brace said slide in the cutting actions of the movable cutting blade, a rocker wing mounted within the guideway of the body and engaging the slot in the slide, a stationary handle carried by the body, a movable handle carried by the body and provided with a crank pin for rocking the wing, said handles being arranged in superposed relation and above the cutting plane of the cutting blades.

In testimony whereof I affix my signature.

ALOIS KIBLER.